(12) United States Patent
Roehm et al.

(10) Patent No.: US 7,679,323 B2
(45) Date of Patent: Mar. 16, 2010

(54) HANDHELD POWER TOOL FORM-LOCKED WITH A DETACHABLE BATTERY PACK

(75) Inventors: Heiko Roehm, Stuttgart (DE); Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 11/696,008

(22) Filed: Apr. 3, 2007

(65) Prior Publication Data

US 2007/0236179 A1 Oct. 11, 2007

(30) Foreign Application Priority Data

Apr. 7, 2006 (DE) .................. 10 2006 018 004

(51) Int. Cl.
*H01M 10/46* (2006.01)
(52) U.S. Cl. ..................................... 320/114
(58) Field of Classification Search ............... 320/107, 320/110, 114, 115; 429/96, 97, 98, 99, 100
See application file for complete search history.

(56) References Cited

U.S. PATENT DOCUMENTS

| | | | |
|---|---|---|---|
| 6,729,414 B2 * | 5/2004 | Cooper et al. | ............... 310/50 |
| 6,729,415 B1 | 5/2004 | Huang | |
| 2004/0196002 A1 | 10/2004 | Watson et al. | |
| 2006/0033467 A1 | 2/2006 | Kubale et al. | |

FOREIGN PATENT DOCUMENTS

| | | |
|---|---|---|
| DE | 103 04 656 | 8/2004 |
| GB | 2 417 978 | 3/2006 |

* cited by examiner

*Primary Examiner*—Edward Tso
(74) *Attorney, Agent, or Firm*—Michael J. Striker

(57) ABSTRACT

A handheld power tool has a handheld power tool base body, a battery pack that is detachable from the handheld power tool base body, and an inner cavity with a wall that constitutes a coupling region for the coupling of the battery pack to the handheld power tool base body. The wall has at least one shaped component that is oriented outward in relation to the inner cavity.

12 Claims, 1 Drawing Sheet

HANDHELD POWER TOOL FORM-LOCKED WITH A DETACHABLE BATTERY PACK

CROSS-REFERENCE TO A RELATED APPLICATION

The invention described and claimed hereinbelow is also described in German Patent Application DE 102006018004.6 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a handheld power tool that has a handheld power tool base body and a battery pack that can be detached from the handheld power tool base body, as recited in the preamble to claim 1.

A handheld power tool, which has a grip and a battery pack and in which the battery pack can be locked to the grip, is known from the prior art. The grip has an inner cavity with a wall and the wall constitutes a contact surface against which the battery pack rests in its locked position.

SUMMARY OF THE INVENTION

The invention is based on a handheld power tool that has a handheld power tool base body, a battery pack that can be detached from the handheld power tool base body, and an inner cavity with a wall that constitutes a coupling region for coupling the battery pack to the handheld power tool base body.

According to the invention, the wall has at least one shaped component that is oriented outward in relation to the inner cavity. This advantageously makes it possible to achieve a particularly compact embodiment of the coupling region. The shaped component of the wall preferably serves to produce a form-locked connection, e.g. a groove/spring connection and/or a detent connection, between the handheld power tool base body and the battery pack. Providing this shaped component in the vicinity of the inner cavity makes it unnecessary to provide components that are separate from the inner cavity in order to produce the desired form-locked connection.

In particular, it is possible to eliminate the respective wall thicknesses of these components, thus saving space that can then be used for the inner cavity. In particular, it is advantageously possible to accommodate large electrical components inside the inner cavity that must usually be placed outside the inner cavity due to their large dimensions. The handheld power tool base body advantageously forms a grip to which a battery pack can be coupled. The shaped component can be embodied as integral to the wall or the shaped component can be added to the wall as a separate component. The term "inner cavity" is understood in particular to mean a cavity that is insulated from the outside. The expression "chamber with a wall" is understood in particular to mean a chamber that is delimited by a wall.

In a preferred embodiment, it is advantageous if the inner cavity is situated in the handheld power tool base body. This makes it possible to achieve a compact embodiment of the battery pack and permits an advantageous protection of the inner cavity. Preferably, the inner cavity is comprised of an extension of the handheld power tool base body. In this case, the wall is preferably embodied as a housing section of the handheld power tool base body. Alternatively, the inner cavity can be situated in the battery pack. In this case, the wall is preferably embodied as a housing section of the battery pack.

It is also advantageous if in the coupled position of the battery pack, the wall is at least partially encompassed by a subregion of the battery pack. This makes it possible to achieve a compact design and to further improve an advantageous protection of the inner cavity in the coupled position.

A compact arrangement of the battery pack on the handheld power tool base body can be achieved if in the coupled position of the battery pack, the inner cavity engages in a recess in the battery pack. The inner cavity engages with the recess preferably in an engagement direction and the shaped component of the wall is suitably oriented at least essentially perpendicular, in particular actually perpendicular, to the engagement direction.

It is also advantageous if the handheld power tool includes at least one component that is mounted in the inner cavity. Mounting the component in the inner cavity renders it unnecessary to provide an installation space that is usually provided outside of the inner cavity for other components of the handheld power tool base body or the battery pack. In this case, the component preferably is distinct from the handheld power tool base body or the battery pack base body, in particular from a battery pack housing. For example, one or more locking elements that serve to lock the battery pack to the handheld power tool base body can be mounted in the inner cavity. If the inner cavity is situated in the handheld power tool base body, then these locking elements can be actuated, for example, by an actuating unit mounted on the handheld power tool base body.

It is also advantageous if the component is embodied in the form of an electrical component. The placement of the electrical component in the inner cavity can achieve an advantageous protection of the electrical component.

If the component is embodied in the form of a printed circuit board, this also permits elimination of a large installation space. For example, the printed circuit board is embodied in the form of a controller board.

In an advantageous modification of the invention, the shaped component is embodied in the form of a guiding means for guiding the battery pack in a guiding direction, which renders it unnecessary to provide additional components and an additional installation space in order to guide the battery pack.

In this connection, it is advantageous if the shaped component is embodied in the form of a guide rail, which makes it possible to achieve a structurally simple design of the guiding means. If the battery pack extends in a longitudinal direction, then the guide rail preferably extends in the longitudinal direction of the battery pack.

Moreover, a convenient guidance of the battery pack can be achieved if the handheld power tool base body forms a grip and the guiding direction is oriented at least essentially perpendicular to the longitudinal direction of the grip.

A particularly simple embodiment of the battery pack can be achieved if the battery pack is embodied in the form of a sliding battery pack. To this end, the battery pack is suitably provided with a contact surface that represents the entire surface of the battery pack that rests against the handheld power tool base body when the battery pack is in the coupled position. Preferably, at least most of this contact surface, particularly preferably the entire contact surface, is embodied as a sliding surface for sliding against the handheld power tool base body when the battery pack is slid into its coupled, in particular locked position. If the base body extends in a longitudinal direction, then this sliding surface preferably extends in the longitudinal direction over at least most of the base body length.

In a preferred modification of the invention, the wall has at least one second shaped component that is oriented outward in relation to the inner cavity, with the electrical component situated between the shaped components. This makes it possible to achieve a compact design of the inner cavity.

If the handheld power tool has an outer surface that covers over the shaped component in the coupled position of the battery pack, then this makes it possible to achieve an advantageous protection of the coupling region, e.g. during operation of the handheld power tool. The term "outer surface" is understood in particular to mean a surface of the handheld power tool that is visible to the user when the battery pack is in the coupled position. This outer surface can be a surface of the handheld power tool base body or preferably a surface of the battery pack.

In addition, a particularly safe operation when coupling the battery pack can be achieved if the shaped component has a support region for supporting the battery pack when the battery pack is being coupled to the handheld power tool base body.

Other advantages ensue from the following description of the drawings. The drawings show an exemplary embodiment of the invention. The drawings, the description, and the claims contain numerous features in combination. Those skilled in the art will also consider the features individually and unite them into other meaningful combinations.

DESCRIPTION OF THE PREFERRED EMBODIMENTS

Figure 1:
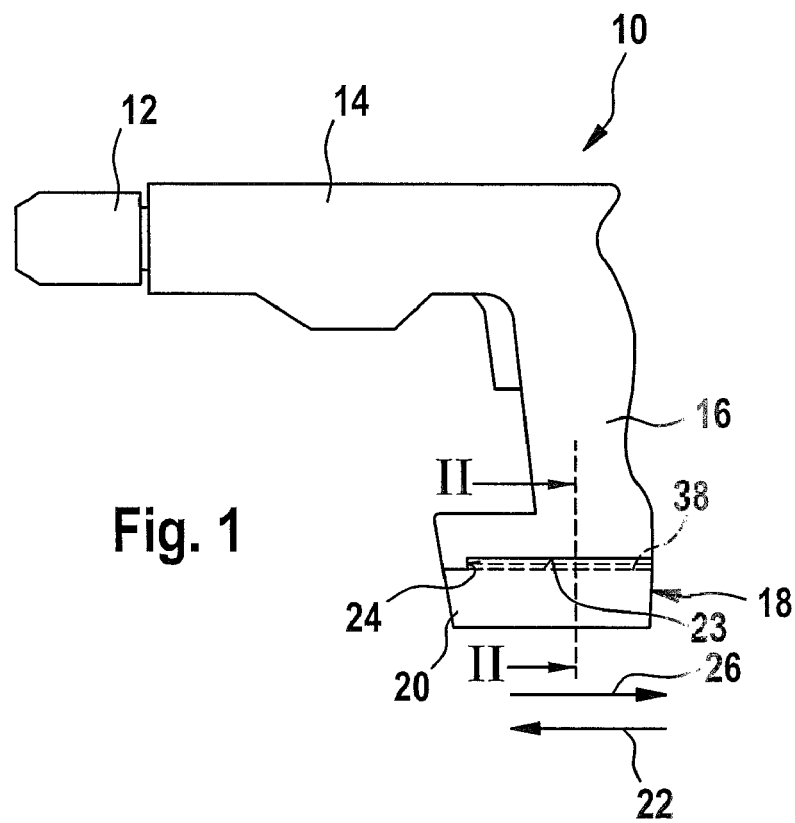
FIG. 1 shows a cordless screwdriver with a grip and a battery pack attached to the grip in accordance with the present invention and FIG. 2 shows a side view of the grip and the battery pack from FIG. 1 in accordance with the present invention.

FIG. 1 shows a handheld power tool 10 embodied in the form of a cordless screwdriver. It has a handheld power tool base body 14 to which a tool holder fitting 12 is fastened. The handheld power tool base body 14 also comprises a grip 16 to which a battery pack 18 is locked. The battery pack 18 has a base body 20, which is embodied as the housing of the battery pack 18. The battery pack 18 is embodied as a sliding battery pack. In order to lock the battery pack 18 to the grip 16, the base body 20 is slid in a guiding direction 22 along the grip 16, in fact along a lower outer surface 23 of the grip 16 extending essentially perpendicular to the longitudinal direction of the grip 16 until the base body 20 strikes against a surface 24 of the grip 16. Once it reaches this position, the battery pack 18 is locked to the grip 16 by means of a locking mechanism that is not shown. In order to guide the base body 20 along the outer surface 23 of the grip 16 in the guiding direction 22, the base body 20 has guide rails 39, 40 that are shown in detail in FIG. 2.

These guide rails 39, 40 are supported by shaped components 38 and 34 of the grip 16, which are likewise embodied in the form of guide rails. The shaped component 38, which is schematically depicted with dashed lines in FIG. 1, and the shaped component 34 are also described in detail in conjunction with FIG. 2. Through actuation of an actuating device that is not shown, the battery pack 18 can be unlocked from the electric appliance 10. After the battery pack 18 is unlocked, the base body 20 can be separated from the electric appliance 10, in fact by sliding the base body 20 in a removal direction 26 along the lower, outer surface 23 of the grip 16. The guiding direction 22 and the removal direction 26 are oriented essentially perpendicular to the longitudinal direction of the grip 16.

Figure 2:
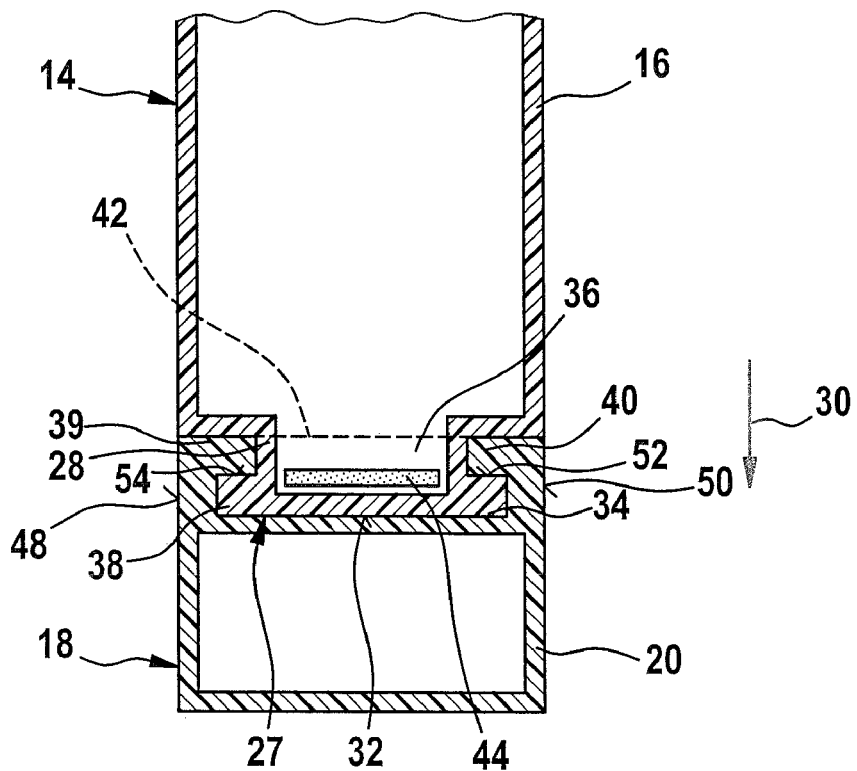

FIG. 2 shows a sectional view of the grip 16 and the battery pack 18 along a plane II-II (FIG. 1). The drawing shows the base body 20 of the battery pack 18 onto which the guide rails 39, 40 are formed. The handheld power tool base body 14 has an inner cavity 36 that accommodates an electric component 44 embodied as a printed circuit board. This inner cavity 36 is comprised of an extension 27 of the handheld power tool base body 14. The extension 27 has a wall 28 that delimits the inner cavity 36.

This wall 28 constitutes a coupling region 32 for the coupling of the battery pack 18 to the handheld power tool base body 14, which coupling region is embodied as a contact surface against which the battery pack 18 is to be placed. This contact surface is also embodied as a sliding surface against which the battery pack 18 can slide when the battery pack 18 is slid along the outer surface 23 of the grip 16. The extension 27 also engages in an engagement direction 30 with a recess 42 of the battery pack 18, which is schematically depicted by a dashed line. The engagement direction 30 is oriented perpendicular to the guiding direction 22 and the removal direction 26.

In the coupled position of the battery pack 18 shown in FIG. 2, the base body 20 encompasses the wall 28. In particular, the base body 20 covers over the wall 28. In addition, the wall 28 has two shaped components 34 and 38 that are oriented outward in relation to the inner cavity 36. The shaped components 34, 38 are oriented perpendicular to the guiding direction 22, the removal direction 26, and the engagement direction 30 of the extension 27. The shaped components 34, 38 are also embodied as guide means for guiding the battery pack 18 in the guiding direction 22, which is oriented perpendicular to the longitudinal direction of the grip 16. To this end, the shaped components 34, 38 are each embodied in the form of a guide rail that extends in the guiding direction 22 (see FIG. 1). As also shown in FIG. 1, the shaped components 34, 38 each extend in the longitudinal direction of the base body 20 over most of the length of the base body 20.

The electric component 44 embodied in the form of a printed circuit board is situated between the shaped components 34, 38 and is electrically connected to rechargeable cells of the battery pack 18 via electrical connection means, not shown, of the grip 16 and via counterpart connection means, not shown, of the battery pack 18. In the coupled position of the battery pack 18 depicted in the drawing, the battery pack 18 has outer surfaces 48, 50 that each cover over a respective shaped component 38, 34. These outer surfaces 48, 50 are each constituted by the base body 20, which covers over the shaped parts 34, 38 in the coupled position of the battery pack 18.

The shaped components 34, 38 also each constitute a support region 52, 54, each of which is embodied as the upper surface of the shaped components 34, 38 embodied in the form of guide rails. By means of these support regions 52, 54, the extension 27 of the handheld power tool base body 14 supports the base body 20, namely the guide rail 40, 39, when the battery pack 18 is slid along the outer surface 23 of the grip 16. This makes it possible to prevent an unintentional release of the battery pack 18. The guide rails 39, 40 and the shaped components 38, 34 embodied in the form of guide rails constitute a spring/groove connection.

It will be understood that each of the elements described above, or two or more together, may also find a useful application in other types of constructions differing from the type described above.

While the invention has been illustrated and described as embodied in a handheld power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A handheld power tool, comprising:
   a handheld power tool base body having an inner cavity with a wall that constitutes a coupling region, said wall having at least one shaped component that is oriented outwards in relation to said inner cavity; and
   a battery pack having a recess and detachably coupled to the handheld power tool base body, the inner cavity engaging the recess while the battery packed being coupled to the hand held power tool base body.

2. A handheld power tool as defined in claim 1, wherein said inner cavity is situated in said handheld power tool base body.

3. A handheld power tool as defined in claim 1, wherein said battery pack has a subregion which, when said battery pack is in a coupled position, at least partially encompasses said wall.

4. A handheld power tool as defined in claim 1; and further comprising at least one component which is mounted in said inner cavity.

5. A handheld power tool as defined in claim 4, wherein said component is configured as an electrical component.

6. A handheld power tool as defined in claim 5, wherein said component is configured as a printed circuit board.

7. A handheld power tool as defined in claim 1; and further comprising a shaped component which is configured as guiding means for guiding said battery pack in a guiding direction.

8. A handheld power tool as defined in claim 7, wherein said shaped component is configured as a guide rail.

9. A handheld power tool as defined in claim 7, wherein said handheld power tool base body forms a grip, and said guiding direction is oriented at least substantially perpendicular to a longitudinal direction of said grip.

10. A handheld power tool as defined in claim 5; and further comprising a first shaped component which is configured as guiding means for guiding said battery pack in a guiding direction, said wall having at least one second shaped component that is oriented outwards in relation to said inner cavity, said electrical component being situated between said first and second shaped components.

11. A handheld power tool as defined in claim 7; and further comprising an outer surface that covers over said shaped component when said battery pack is in a coupled position.

12. A handheld power tool as defined in claim 7, wherein said shaped component constitutes a support region for supporting said battery pack when said battery pack is being coupled to said handheld power tool base body.

* * * * *